(12) United States Patent
Belknap (10) Patent No.: US 6,996,708 B1
(45) Date of Patent: Feb. 7, 2006

(54) METHODS AND APPARATUS FOR AUTOMATICALLY SELECTING AND LOADING INITIALIZATION SOFTWARE FOR A HARDWARE CONFIGURATION

(75) Inventor: William M. Belknap, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 550 days.

(21) Appl. No.: 10/260,776

(22) Filed: Sep. 30, 2002

(51) Int. Cl.
*G06F 15/177* (2006.01)
*G06F 9/445* (2006.01)

(52) U.S. Cl. ........................................................ 713/2
(58) Field of Classification Search ................ 713/200, 713/2
See application file for complete search history.

(56) References Cited

U.S. PATENT DOCUMENTS 5,325,536 A * 6/1994 Chang et al. ............... 710/263
5,459,854 A * 10/1995 Sherer et al. .................. 713/1
5,493,727 A * 2/1996 Ohya ............................. 713/1
6,490,677 B1 * 12/2002 Aguilar et al. ................. 713/1

* cited by examiner

*Primary Examiner*—Lynne H. Browne
*Assistant Examiner*—Eric Chang
(74) *Attorney, Agent, or Firm*—Priest & Goldstein, PLLC (57) ABSTRACT

Techniques for selecting and loading a correct initialization software module for managing communication by a scanner with a terminal over a universal serial bus connection are described. A bootloader is transferred from semipermanent memory to RAM and executed. The bootloader detects a configuration in which a scanner is being used, selects a correct initialization for use with the scanner and copies an interrupt service request table for the selected module to an image of the bootloader in the semipermanent memory. The image of the bootloader is then transferred to RAM, with the interrupt service request table being stored in an appropriate location in RAM. The bootloader then transfers an executable code block for the selected initialization module from the semipermanent memory to the RAM for execution.

12 Claims, 6 Drawing Sheets

METHODS AND APPARATUS FOR AUTOMATICALLY SELECTING AND LOADING INITIALIZATION SOFTWARE FOR A HARDWARE CONFIGURATION

FIELD OF THE INVENTION

The present invention relates generally to initialization of hardware devices. More particularly, the invention relates to advantageous techniques for detecting a configuration of a terminal to which a bar code scanner is connected using a USB connection and automatically selecting and loading an appropriate initialization protocol for the scanner's communication with the terminal.

BACKGROUND OF THE INVENTION

Many hardware devices are intended to be used as components of larger systems, and the particular configuration of a system in which a hardware device will be used may not be known at the time the hardware device is manufactured. For example, point of sale systems are found in any number of configurations. Different point of sale systems may include terminals from different manufacturers, with the terminals using different memory, processors and operating systems. It may be desirable to include a bar code scanner as a component of such a system, and it may be desired to market a bar code scanner that can be incorporated into a variety of different point of sale systems without requiring any modification to the bar code scanner in order to adapt it for use in one system or another. One particularly convenient way to incorporate a scanner into a point of sale system is to connect the scanner to a universal serial bus (USB) port in the terminal in order to allow communication between the scanner and the terminal. The USB connection makes it easy to physically connect and disconnect a scanner from a terminal and this ease of connection and disconnection makes it easy to physically transfer a scanner from one point of sale system to another. Jumpers, DIP switches or other indicators may be set in order to indicate the configuration or operating environment in which the scanner is being used. The configuration or operating environment includes aspects such as the components used with the scanner, such as the particular design or brand of terminal with which the scanner is being used. A scanner that would adapt to such transfer without a need for significant modification to the hardware or software of the scanner would be highly desirable.

A scanner which can be connected to a USB port typically includes a USB controller to allow communication with the device or system to which the scanner is connected. Upon startup of the scanner, the scanner performs initialization. Initialization includes proper initialization of the USB controller. This initialization may suitably be performed by loading appropriate initialization routines from semipermanent memory such as an EEPROM into regular memory such as RAM and executing the routines.

Proper initialization requires that the correct routines be present in the EEPROM or other semipermanent memory and that they be selected, loaded into the correct location in RAM and executed properly. If a scanner is to be used in only one system configuration and with one terminal, the desired initialization routine can be stored in the EEPROM of the scanner. At power up of the scanner, the initialization routine is copied from the EEPROM into the RAM and executed. However, a scanner having only one stored initialization routine can be used only with the terminal configuration for which the initialization routine is adapted, unless the scanner is reprogrammed with a new initialization routine before use in a different configuration.

For many devices, it is possible to install a bootloader that will be executed upon power up of the device. Upon power up, the bootloader detects the configuration in which the device is being used, selects an initialization routine for use with the detected configuration and loads the selected initialization routine. However, a highly popular and widely used communication controller, to control USB connections with bar code scanners, employs hardware that requires a portion of the initialization routine to be loaded into a memory location that is accessible only under certain circumstances and that is inaccessible for reading and writing by the bootloader.

There exists, therefore, a need for techniques to allow automatic selection and loading of one of a number of available initialization routines and the proper loading of the initialization routines into the necessary memory locations.

SUMMARY OF THE INVENTION

A scanner according to an aspect of the present invention is connected to a terminal using a USB connection comprising a USB port in the scanner, a USB port in the terminal and a USB cable for connecting the ports. The scanner includes a USB control module that can automatically detect the components and configurations of components with which the scanner is being used. Upon detection of the configuration, the USB control module selects initialization software that will properly manage communication between the scanner and the terminal being used and loads the initialization software. The initialization software is stored in EEPROM and is loaded to RAM for use.

A preferred implementation of the USB control module employs an interrupt service request table comprising jumps to appropriate points in the initialization software, in response to interrupts and service requests. The interrupt service request is preferably loaded to an area of memory that is inaccessible for normal reading and writing, but can only be read in response to an interrupt.

In order to allow for proper detection of the configuration and loading of the appropriate software, the USB control module implements a bootloader that performs a multistep process in order to load the correct initialization software. The USB control module is stored in EEPROM. Upon initial startup of the USB controller, the bootloader is copied from EEPROM to RAM and executed. The bootloader detects the configuration in use and selects the interrupt service request table appropriate for the configuration. The bootloader then appends the selected interrupt service request table to the image of the bootloader stored in EEPROM. The bootloader then forces a reset of the USB control module, causing the image of the bootloader in EEPROM, including the selected interrupt service request table, to be copied into RAM. The bootloader then loads executable code for the selected module from EEPROM to RAM. Any code that would overwrite the bootloader is stored in a temporary location. Once the executable code for the selected module is copied into RAM, any data stored in the temporary location is copied to its correct location for execution. Control of the USB control module is then turned over to the selected module.

By following the sequence described above, it is possible to automatically detect the configuration to be used, and to select and load initialization software required for the configuration. In particular, it is possible to load the correct interrupt service request table into the correct location in memory, even though this area in memory is not accessible to the normal execution of the bootloader.

A more complete understanding of the present invention, as well as further features and advantages of the invention, will be apparent from the following Detailed Description and the accompanying drawings.

DETAILED DESCRIPTION

Figure 1:
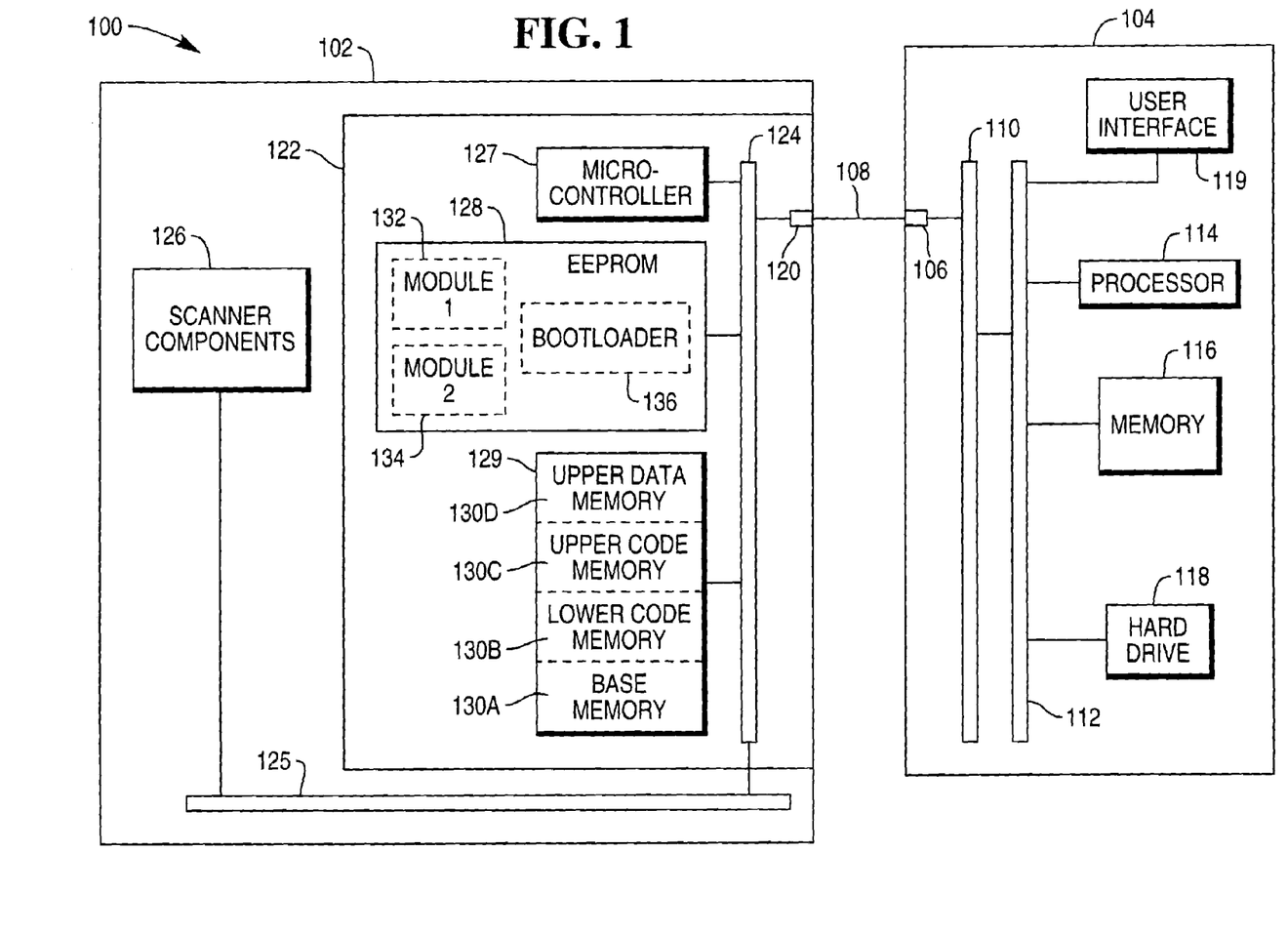
FIG. 1 illustrates a point of sale system according to the present invention.

FIG. 1 illustrates a point of sale system 100 employing the teachings of the present invention. The point of sale system 100 includes a scanner 102, connected to a terminal 104. The scanner 102 is connected to a USB port 106 in the terminal 104, using a USB connection cable 108. The USB port 106 is connected to a terminal universal serial bus 110, which is in turn connected to a terminal system bus 112. The terminal 104 also includes a processor 114, memory 116, optional hard drive 118 and user interface 119. These components allow the terminal 104 to communicate with an operator, to issue commands to and receive data from the scanner 102 and to perform other functions needed to process transactions.

The cable 108 is connected to a USB interface port 120 in the scanner 102. The USB interface port 120 is part of a USB communication control module 122 within the scanner 102 to carry out communications with the terminal 104. The USB communication control module 122 includes the USB interface port 120 to allow communication with the terminal 104, and a universal serial bus 124 connected to the USB interface port 120 in order to allow data transfer between the various devices within the control module 122 and between the devices within the control module 122 and the USB interface port 120. The universal serial bus 124 is also connected to a scanner system bus 125, to allow the USB control module 122 to communicate with the scanner components 126. The scanner components 126 are referred to collectively here and not described in detail, but include light generation and detection and signal processing components typically used in bar code scanners to detect and decode bar code information. The USB control module 120 controls communication by the scanner 102 with the terminal 104 over the USB connection represented by the USB ports 106 and 120 and the USB cable 108, and allows the scanner 102 to receive commands from and provide data to the terminal 104.

The control module 122 includes a microcontroller 127 to manage data transfer between the scanner 102 and the terminal 104. In the exemplary embodiment described here, the microcontroller 127 is an INTEL® 8051 microcontroller or one of its variants. The INTEL® 8051 and its variants are extremely popular and widely used. The control module 122 also includes a relatively stable memory, such as a serial EEPROM 128, for storage of programs and instructions, such as initialization protocols. The control module 122 further includes short term memory, such as a RAM 129, in order to allow temporary data storage and retrieval during the operation of the control module 122, and to host the software executed by the microcontroller 127. The EEPROM 128 and the RAM 129 may suitably be built into the microcontroller 127, but are shown separately here for ease of illustration.

The USB interface port 120 is a standardized interface and allows easy connection to a wide variety of host devices such as the terminal 104. In addition, the port 120 allows the scanner 102 to be easily disconnected from one host device and connected to another. Point of sale systems may be found in a wide variety of configurations, using a wide variety of terminals such as the terminal 104. Different terminals, all usable in a system such as the system 100, may be found with different central processors, different operating systems and the like. Physical connection of the scanner 102 to any of these different terminals is easily accomplished, provided that such terminals can accommodate a USB connection. In order to increase the usefulness of the scanner 102 and to take full advantage of the easy physical connectivity offered by the USB interface port 120, it is desirable that the scanner 102 be able to be installed for use with one of variety of different terminals without a need to specifically configure the hardware of the scanner 102 for use with a particular terminal configuration.

In order to accomplish this flexibility of installation, the control module 122 is preferably adapted so that on startup it senses the configuration of the terminal being used, as between at least two possible configurations of terminals. The communication control module 122 initializes for operation with the terminal configuration to which the scanner 102 is connected. Initialization is performed by loading firmware from the EEPROM 128 into the RAM 129, in a location in RAM that will cause the initialization firmware to be detected and executed by the microcontroller 127 upon power up or reset. In the exemplary embodiment described here, the microcontroller 127 is an INTEL® 8051 and a portion of the initialization firmware must be loaded into the lower 80H bytes of RAM 129. This location in the RAM 129 is referred to herein as base memory 130A. The RAM 129 also includes lower memory 130B, upper executable memory 130C and upper data memory 130D. The lower memory 130B is accessible for copying and loading of software and is accessible for the sequential execution of software. That is, a block of software loaded into the lower executable memory 130B or upper executable memory 130C can be sequentially retrieved and executed. The upper data memory 130D is accessible for loading of software, but is not accessible for the sequential execution of software. A software routine stored in the upper memory 130C is accessible through a jump command. It will be recognized that reference to areas of the RAM 129 as base memory, lower memory, upper memory and data memory does not describe actual characteristics of the areas of the RAM 129, but instead describes distinctions in the way the areas of the RAM 129 are treated by the microcontroller 127.

The portion of the bootloader that must be loaded into the base memory 130A is a table of interrupt service request (ISR) entry points, hereinafter referred to as an ISR table.

The ISR table is a collection of jumps to correct locations in the initialization firmware, in response to various interrupts. For example, a reset will cause a jump to one location, an alert that a scale is being used will cause a jump to another location, and so on. Different initialization firmware must be loaded for each possible terminal configuration, and each load of initialization firmware has its own ISR table that must be loaded into the base memory 130A.

When used with an INTEL® 8051, the base memory 130A is inaccessible to conventional software. Instead, anything written to the base memory 130A must be written in response to an interrupt such as a power up or reset. In the present embodiment, an EEPROM controller, shown in FIG. 2 and discussed further below, copies data from designated locations in the EEPROM 128 to the RAM 129. The EEPROM controller has access to the base memory 130A, and can copy data into memory locations in the base memory 130A. If only one possible initialization protocol were to be used, it would be a simple matter to store the correct protocol in the EEPROM 128. The ISR table associated with the protocol would be automatically loaded into the correct location of the base memory 130A upon reset or power up of the control module 122.

However, as noted above, the scanner 102 is adapted for use with different configurations and is adapted to move easily between different configurations. The control module 122 therefore must be able to load appropriate firmware for every possible terminal configuration with which the scanner 102 may be used. In order to enable the control module 100 to load the appropriate firmware, a plurality of initialization modules are stored in the EEPROM 128, so that the correct module may be selected and loaded in order to initialize the control module 122 for use with the particular terminal configuration being employed with the scanner 102. For simplicity of explanation, a first module 132 and a second module 134 are illustrated in FIGS. 1–5 and described herein. It will be recognized, however, that numerous different modules may be stored, selected and loaded as described below, in order to allow operation of the scanner 102 with any of a number of alternative terminal configurations. The only constraint limiting the number of modules that may be stored is the capacity of the EEPROM 128.

The first initialization module 132 and the second initialization module 134 each include an ISR table that must be loaded into the base memory 130A and an executable code block that can be loaded into the lower executable memory 130B and the upper executable memory 130C. In order to select and load the correct one of the modules 132 and 134, a bootloader 136 is also stored in the EEPROM 128. The bootloader 136 is preferably a small software program, loaded into the RAM 129 upon initialization of the control module 122 and executed by the microcontroller 127. The function of the bootloader 136 is to sense the terminal configuration being used, select the correct one of the modules 132 and 134 and load the selected module into appropriate locations in the RAM 129.

The ISR table for the selected one of the modules 132 and 134 must be loaded into the base memory 130A. However, the bootloader 136 cannot directly access the base memory 130A. Therefore, upon startup or reset of the control module 122, the control module 122 goes through a multiple step initialization process so that the correct one of the modules 132 and 134 will be loaded into the correct location in the RAM 129.

Figure 2:
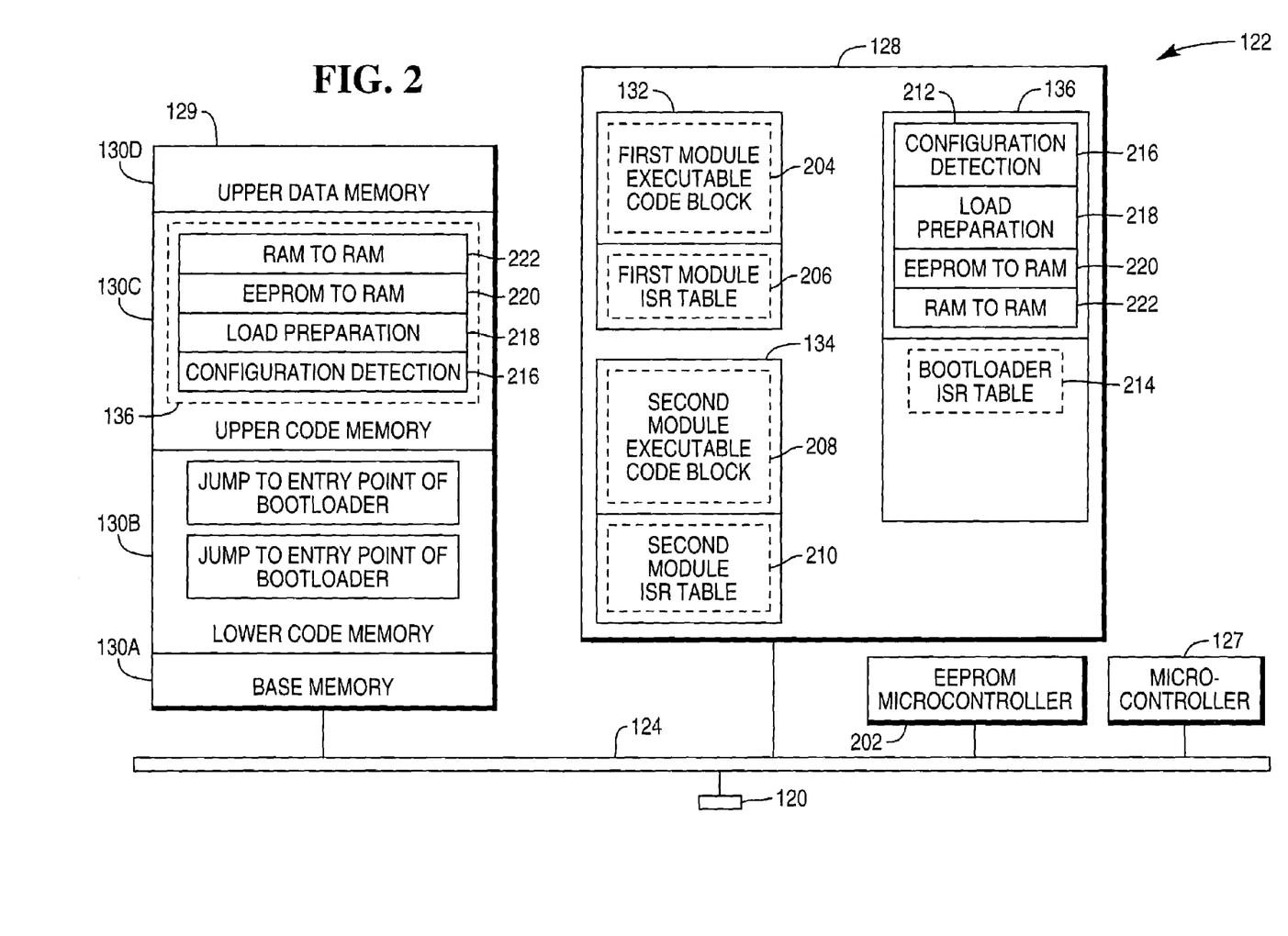
FIG. 2 illustrates an initial state of a USB control module according to the present invention after power up just prior to execution of the bootloader.

FIG. 2 illustrates additional details of the control module 122, showing details of the microcontroller 127, the EEPROM 128, an EEPROM microcontroller 202, and the RAM 129, including additional details of the first and second modules 132 and 134, and the bootloader 136. FIG. 2 illustrates the control module at an initial state, with the bootloader 136 and the first and second modules 132 and 134 residing in the EEPROM 128 and after the EEPROM microcontroller 202 has loaded the bootloader 136 into memory 129, but before the first execution of the bootloader.

The EEPROM 128 can be seen to contain the first module 132, the second module 134 and the bootloader 136, as well as unused space into which an additional ISR table may be placed. The first module 132 includes a first module executable code block 204 and a first ISR table 206, the second module 134 includes a second module executable code block 208 and a second ISR table 210 and the bootloader 136 includes the bootloader executable code block 212 and a bootloader ISR table 214. The bootloader executable code block 212 comprises a configuration detection module 216, a load preparation module 218, an EEPROM to RAM copy module 220, a RAM to RAM copy module 222 and space for an additional ISR Table.

At initial power up of the control module 122, the EEPROM microcontroller 202 loads the bootloader 136 into the RAM 129. The bootloader executable code block 212 is loaded into upper executable memory 130C. The configuration detection module 216, the load preparation module 218 and the EEPROM to RAM copy module 218 are loaded into the upper executable memory 130C and the RAM to RAM copy module 222 is loaded into the topmost portion of the upper executable memory 130C. The bootloader ISR table 214 is loaded into the base memory 130A. The microcontroller 127 is held in a reset state while the transfer is taking place, inhibiting any execution of software present in or being loaded into the RAM 129. The holding of the microcontroller 127 in a reset state, with the transfer of data from the EEPROM 128 to the RAM 129 is similar to what happens in a conventional initialization of the control module 122 in which the initialization software is loaded, but in this case the data being loaded is the bootloader 136 and the bootloader 136 will select and load the appropriate software for the terminal configuration being used.

Once the initial load of the bootloader 136 is complete, the microcontroller 127 is released from the reset state, causing execution of the bootloader 136. The configuration sensing module 216 senses the configuration of the terminal to which the scanner 102 is connected. Sensing of the configuration may suitably be accomplished through sensing of an arrangement of straps, jumpers, dip switches, control lines or the like on a circuit board belonging to the terminal 104, by information provided by the scanner 102 upon sensing of the terminal configuration, or by any other suitable means, such as sensing the position of straps, jumpers or dip switches on a circuit board belonging to the scanner 102. Such straps, jumpers or dip switches may be set in preparation for connecting the scanner 102 to the terminal 104. Upon sensing of the configuration, the configuration sensing module 216 identifies the module to be loaded for initialization and provides this identification to the load preparation module 218.

Upon receiving the identification of the module to be identified, the load preparation module 218 copies the first ISR table 206 or the second ISR table 210 at the end of its load. The copied ISR table 206 or 210 will overwrite the bootloader ISR table 214, depending on whether the first module 132 or the second module 134 has been selected for loading. The image of the bootloader 136 in the EEPROM 128 thus includes either the first ISR table 206 or the second ISR table 210, depending on whether the first module 132 or the second module 134 has been selected. The bootloader ISR table 214 is used for starting the bootloader 136 and is not used in the continued execution of the bootloader 136. The bootloader ISR table 214 contains only a jump to the power up/reset entry point of the bootloader 136 to be executed on initial power up. The power up/reset entry point is the entry point of the configuration detection module 216, and allows proper execution of the bootloader 136.

The first ISR table 206 and the second ISR table 210 also contain jumps to appropriate locations of their respective modules, to be executed upon power up or reset of the control module 122. The bootloader 214 places jumps at the same locations in the lower executable memory 130B at these respective entry points. These jumps are jumps to the entry point of the bootloader. Therefore, overwriting the bootloader ISR table 214 with the first ISR table 206 or the second ISR table 210 will not prevent execution of the bootloader 136.

Once the load preparation module 218 has prepared the correct image of the bootloader 136 in the EEPROM 128, the load preparation module 214 causes a reset of the control module 122, suitably by controlling a reset line of the control module 122 or by sending a suitable command to the scanner 102. Upon the reset of the control module 122, the EEPROM microcontroller 202 loads the bootloader 136 residing in the EEPROM 128 into the RAM 129, with the executable portion of the bootloader 136 in the lower memory 130B and the ISR table 206 or 210, as appropriate, in the base memory 130A. Upon the load of the bootloader 136 with the selected ISR table included, that is, with the ISR table 206 or 210 included, the bootloader 136 begins execution as before. The configuration detection module 216 examines the ISR table in the base memory 130A to determine whether the ISR table residing in the base memory 130A matches the configuration in which the scanner is being used. If the ISR table residing in the base memory 130A does match the configuration in which the scanner is being used, the bootloader 136 jumps to the EEPROM to RAM copy module 220 and does not repeat the loading of the ISR table. In the present example, the correct ISR table is already loaded into the base memory 130A, because it was loaded by the EEPROM microcontroller 202 after loading of the bootloader ISR table and bootloader code. Upon execution, the EEPROM to RAM copy module 220 copies the executable code block 204 or 210 to the upper memory 130B, depending on whether the first or second initialization module 132 or 134 has been selected. In order to prevent memory conflicts and overwriting of the bootloader 136 by the executable code block, the EEPROM to RAM copy module 220 includes identification of the locations in the RAM 129 occupied by the bootloader 136. For any write operation that would cause overwriting of the bootloader 136, the EEPROM to RAM copy module 220 writes the data into the upper data memory 130D. The EEPROM to RAM copy module 220 copies the entire executable code block into the RAM 129, either in the desired location in the lower memory 130B or in the temporary storage location in the upper data memory 130D.

Once the entire executable code block has been copied into the RAM 129, the EEPROM to RAM copy module 220 executes a jump command to the RAM to RAM copy module 210. The RAM to RAM copy module 210 is a very small routine, preferably stored in the top of the upper memory 130C. The RAM to RAM copy module 210 copies the stored data belonging to the executable code block into the upper executable memory 130C, while inhibiting writes to itself. At this point, the bootloader 136, other than the RAM to RAM copy module 222, can be overwritten, because the only remaining actions required for initialization are the copying of the executable code block into upper executable memory 130C and the jump to the entry point of the module. Once copying is complete, the RAM to RAM copy module 222 executes a jump to the program entry point of the module that has been loaded.

Figure 3:
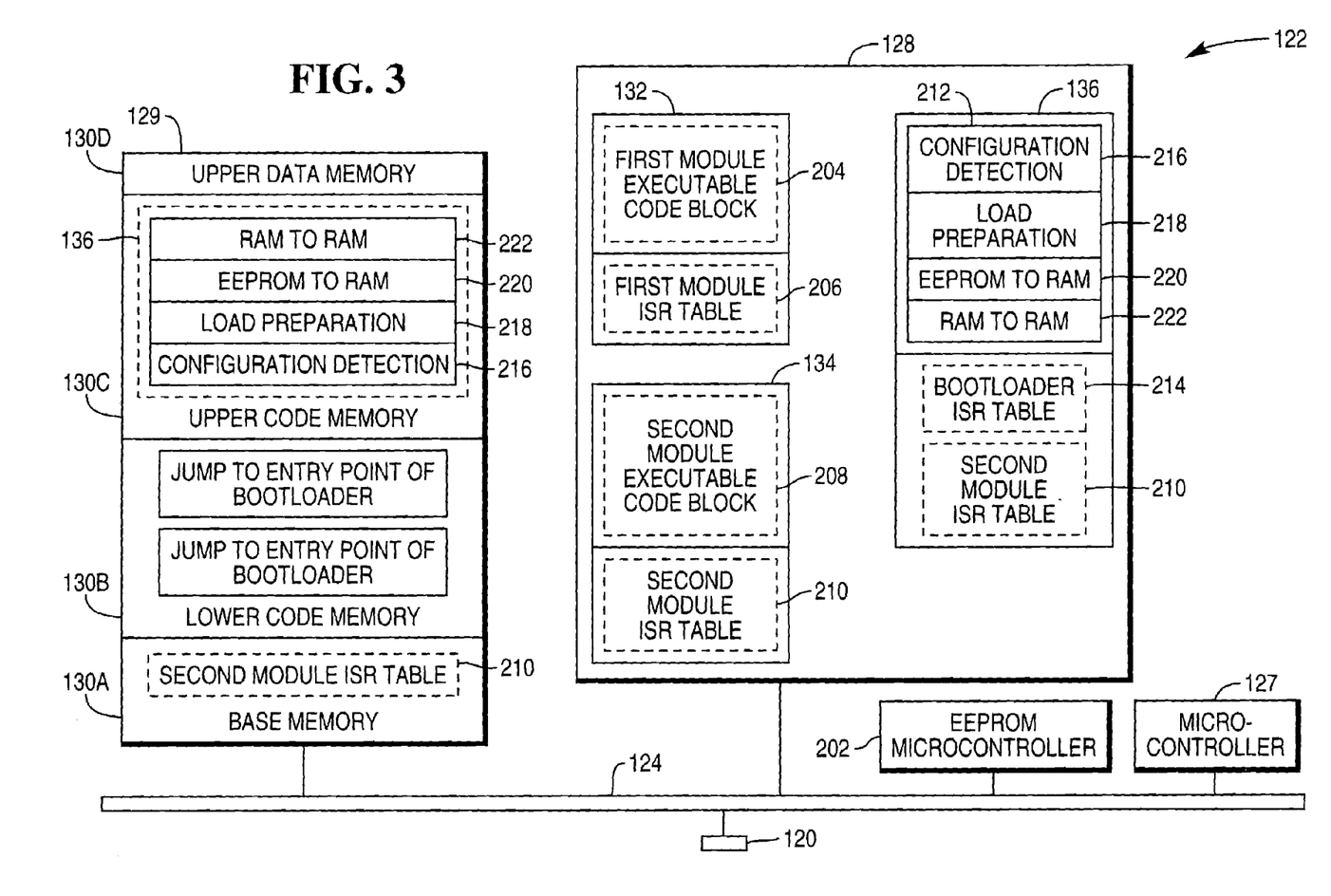
FIG. 3 illustrates a further state of a USB control module according to the present invention, after initial power up and a first bootloader execution.

FIG. 3 illustrates the control module 122, after initial power up, once the bootloader 136 has been transferred into the RAM 129 and the configuration detection module 216 has been satisfied that the required configuration and the ISR table for that module are loaded into the RAM 129. The bootloader 136 has been copied by the EEPROM microcontroller 202 from the EEPROM 128 into the RAM 129, with the bootloader ISR table 214 having been overwritten by the second module ISR table 210 in the base memory 130A, the configuration detection module 216, the load preparation module 218 and the EEPROM to RAM copy module 220 being in the upper executable memory 130C and the RAM to RAM copy module 222 being in the top of the upper executable memory 130C. In the present example, the second module ISR table 210 has overwritten the bootloader ISR table 214, so that the bootloader ISR table 214 has been replaced in RAM, but still resides in the EEPROM 128.

Figure 4:
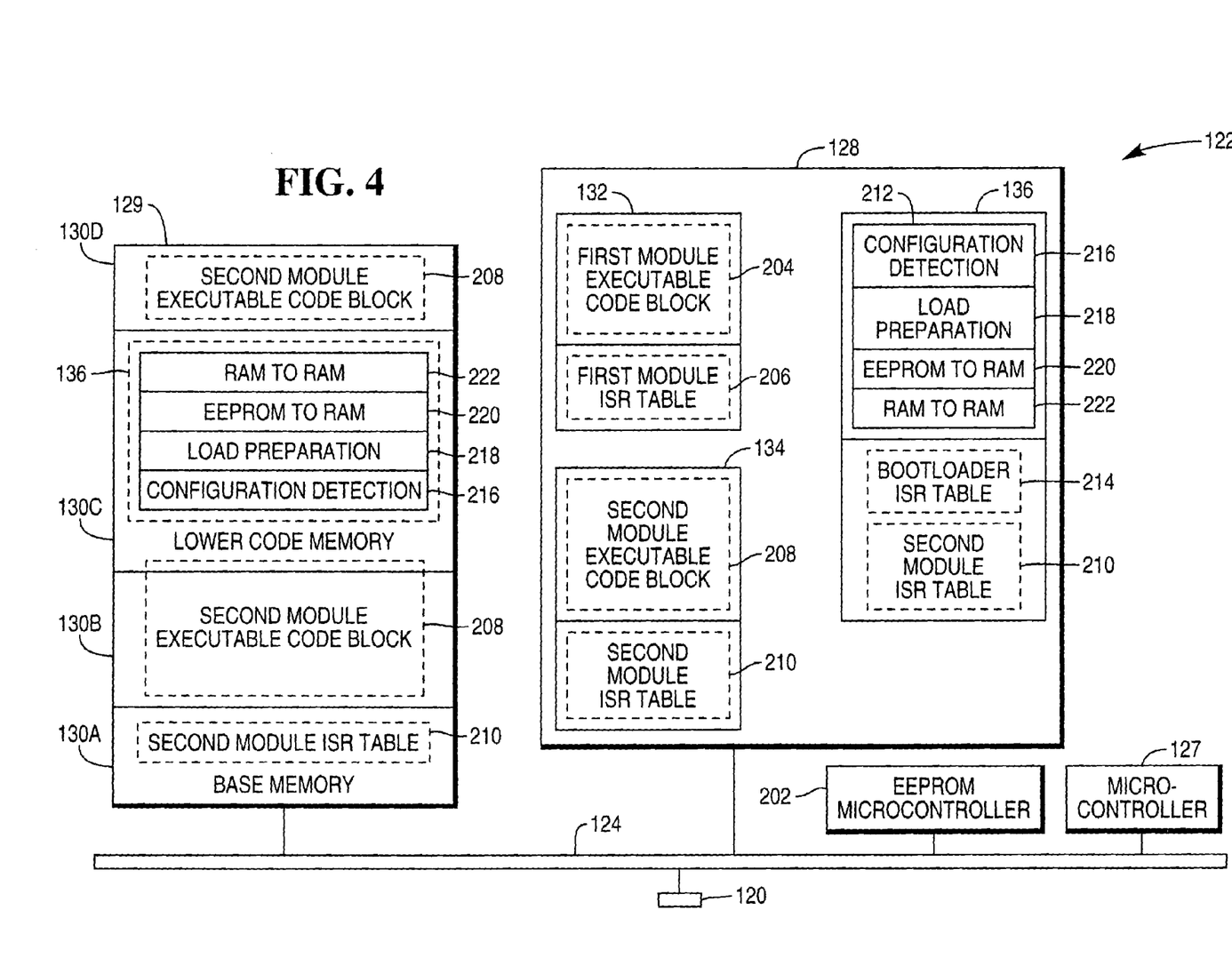
FIG. 4 illustrates a further state of a USB control module according to the present invention, after transfer of initialization module information into RAM.

FIG. 4 illustrates the control module 122 after execution of the EEPROM to RAM module 220 has completed execution and before the jump to the RAM to RAM copy routine 222. It can be seen that the second module ISR table 210 has been copied to the base memory 130A, and the second module code block 208 has been copied to the RAM 129. Copying of a code block of an initialization module normally occurs beginning at the lowest location of the lower memory 130B and progressing upward. In this case, however, in order to avoid overwriting the bootloader 136, any data belonging to the second module code block 208 that would overwrite the bootloader has been stored in upper data memory 130D. Copying of this data to its proper location in the lower memory 130B is performed by the RAM to RAM copy module 222.

Figure 5:
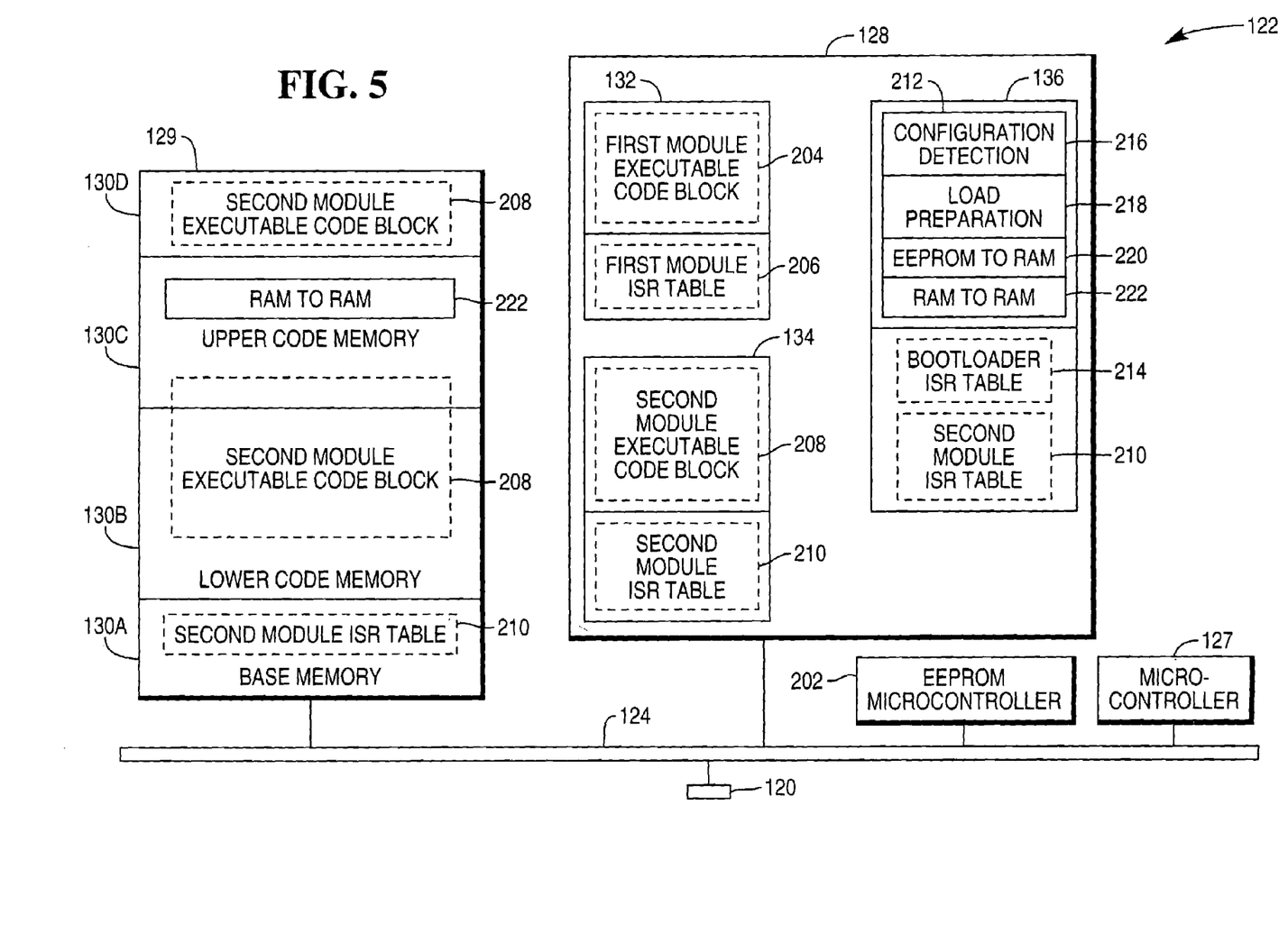
FIG. 5 illustrates a further state of a USB control module according to the present invention, with a selected initialization module loaded into RAM and properly positioned and sequenced in RAM.

FIG. 5 illustrates the control module 122, after the execution of the RAM to RAM copy module 222. It can be seen that the second module executable code block 208 has been copied to contiguous locations in the lower code memory 130B and upper code memory 130C, and that the second module ISR table 210 is in its proper place in the base memory 130A. The second module executable code block 208 has overwritten the bootloader 136 in the lower memory 130B, but this does not interfere with proper loading of the code block 208. Once the EEPROM to RAM module 220 has finished executing, the entire load of the selected initialization module is present in the RAM 129, and the only element of the bootloader 126 that needs to be present is the RAM to RAM copy module 222.

Once the RAM to RAM copy module 222 has executed, the load of the second module 134 into the RAM 129 is complete and the second module 134 is ready to be executed in order to control the communication between the scanner 102 and the terminal 104. This is accomplished by jumping to the entry point of the loaded module.

Figure 6:
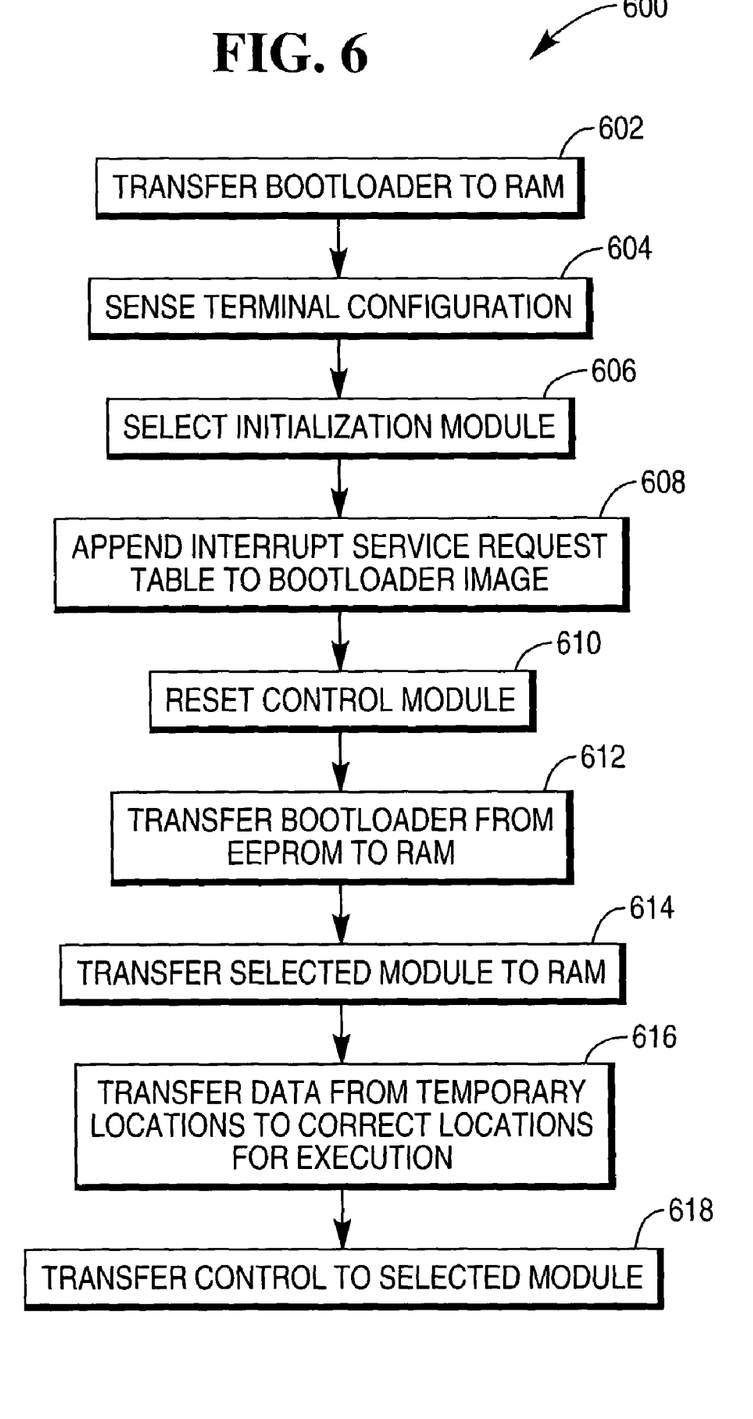
FIG. 6 illustrates a process of configuration detection and initialization according to the present invention.

FIG. 6 illustrates a process 600 of configuration detection and initialization according to the present invention. The process 600 may suitably be employed to load an appropriate initialization software module into memory used by a communication control module similar to the control module 122 of FIG. 1, with the correct initialization software module being selected in response to detection of a configuration of a terminal with which the control module is to manage communications. At step 602, upon application of power to the control module, a bootloader is transferred from EEPROM to RAM in order to allow for execution of the bootloader. At step 604, the configuration of a terminal with which the control module is to manage communication and to which the control module is connected is detected by examining straps in the hardware or control lines from the scanner, for example the arrangement of straps or jumpers on a circuit board or other component within the scanner. A circuit board or other component may have an array of pairs of pins on which jumpers can be placed. The jumpers can be placed to connect specified pairs of pins out of the array in order to set operational parameters of the circuit board or component. The placement of jumpers can be sensed and interpreted to identify the configuration indicated by the placement.

At step 606, an initialization module appropriate for the detected terminal configuration is selected. At step 608, an interrupt service request table belonging to the initialization module is appended to the image of the bootloader residing in EEPROM. At step 610, the control module is reset. At step 612, the bootloader is transferred from EEPROM to RAM, with the bootloader including the appropriate interrupt service request table. At step 614, executable code belonging to the selected initialization module is transferred from EEPROM to RAM, with any data that would overwrite the bootloader being stored in a temporary location in RAM. At step 616, upon completion of transferring of the initialization module to RAM, the data stored in the temporary location in RAM is transferred to correct locations for execution. At this point, loading of the selected initialization module is complete. At step 618, control is passed to the selected initialization module and the communication control module operates under the control of the initialization module.

While the present invention is disclosed in the context of a presently preferred embodiment, it will be recognized that a wide variety of implementations may be employed by persons of ordinary skill in the art consistent with the above discussion and the claims which follow below.

I claim:

1. A communication control module for managing communication between a scanner hosting the communication control module and one of a plurality of alternative terminal configurations with which the scanner may be used, the communication being conducted over a universal serial bus connection, the communication control module comprising:
   a microcontroller;
   a RAM memory for storing data and software executed by the microcontroller, a portion of the RAM being base memory accessible only in response to interrupts;
   a semipermanent memory for storing software to be transferred to the RAM when required in the operation of the communication control module, the semipermanent memory being operative to transfer software to RAM upon power up or reset of the control module;
   a plurality of alternative initialization modules hosted in the semipermanent memory, each of the alternative initialization modules being adapted for use to control communication between the scanner and a specified one of the alternative terminal configurations, one of the alternative initialization modules being selected and loaded into RAM when needed to manage communication between the control module and a terminal, each initialization module including an interrupt service request table adapted to the specified terminal configuration with which the module is adapted for use; and a bootloader hosted in the semipermanent memory, the bootloader operating to detect a configuration in which the scanner is being used, detection of the configuration including detection of the terminal configuration with which the scanner is being used, and to select an initialization module to be loaded in order to manage communication with the detected terminal configuration, the bootloader being further operative to cause the transfer of the selected initialization module to the RAM for execution of the initialization module by the microcontroller, the transfer including transfer of the interrupt service request table into the base memory.

2. The control module of claim 1, wherein the semipermanent memory is controlled by a semipermanent memory microcontroller for transferring data from the semipermanent memory to the RAM in response to a power up or reset of the control module.

3. The control module of claim 2, wherein the bootloader is transferred to the RAM upon power up of the control module, and wherein the bootloader senses the configuration, selects the correct initialization module, appends the interrupt service request table for the selected initialization module to a bootloader image in the semipermanent memory and resets the control module in order to cause the semipermanent memory microcontroller to transfer the bootloader image, including the interrupt service request table for the selected initialization module, to RAM, with the interrupt service request table being transferred to the base memory.

4. The control module of claim 3, wherein the bootloader transfers an executable code block for the selected initialization module into RAM for execution by the microcontroller.

5. The control module of claim 4, wherein the bootloader initially transfers the executable code block into RAM by transferring data that would not overwrite the bootloader into the correct memory locations for execution by the microcontroller and transferring data that would overwrite the bootloader into temporary storage locations in memory.

6. The control module of claim 5, wherein the bootloader, after initially transferring the executable code block into RAM, transfers the data that has been transferred into temporary storage locations into correct memory locations for execution.

7. The control module of claim 6, wherein the microcontroller is based on an INTEL® 8051 microcontroller.

8. A bootloader for sensing a configuration of a specific one of a plurality of alternative terminal configurations connected to a scanner using a universal serial bus connection and selecting and loading an appropriate one of a plurality of alternative initialization modules, to control the operation of a communication control module for managing communication between the scanner and the terminal each one of the plurality of alternative initialization modules controlling communication between the scanner and a specified terminal configuration to which the initialization module is adapted, comprising:
   a configuration detection module for detecting a configuration in which the scanner is to be used, detection of the configuration including identification of the specific terminal configuration with which the scanner is being used;
   a load preparation module for appending an interrupt service request table belonging to the selected initialization module to an image of the bootloader stored in semipermanent memory, in order to allow transfer of the bootloader image including interrupt service request table from semipermanent memory to a RAM upon reset of the control module, the interrupt service request table being adapted for use with a specified terminal configuration for which the initialization module is adapted; and one or more software modules for transferring an executable code block for the selected initialization module to the RAM for execution in order to control the operation of the control module.

9. The control module of claim 8, wherein the one or more software modules for transferring the executable code block to RAM include a semipermanent memory to RAM transfer module for transferring the executable code block for the selected initialization module from semipermanent memo to RAM, the semipermanent memory to RAM transfer module being operative to transfer any data in the executable code block that would overwrite the bootloader to a temporary location in RAM and a RAM to RAM transfer module for copying data from the temporary locations in RAM to correct locations for execution in order to control the operation of the control module.

10. A method of initialization of a bar code scanner for communication with a terminal over a universal serial bus connection, comprising the steps of:

transferring a bootloader from a semipermanent memory to a RAM for execution;

sensing a configuration of a terminal connected to the scanner;

selecting an initialization module for use with the detected terminal configuration, the initialization module being one of a plurality of alternative initialization modules, each of the plurality of alternative initialization modules being adapted to control communication between the scanner and a specified terminal configuration associated with the module;

copying an interrupt service request table for the selected initialization module to an image of the bootloader in the semipermanent memory, the interrupt service request table being one of a plurality of alternative interrupt service request tables, each of the alternative service request tables being adapted to one of the alternative initialization modules and being adapted for use with the specified terminal configuration with which the initialization module is adapted for use;

transferring the image of the bootloader from the semipermanent memory to the RAM, including the interrupt service request table for the selected initialization module; and transferring an executable code block for the selected initialization module from semipermanent memory to RAM for execution in order to control the operation of the control module.

11. The method of claim 10, wherein the step of transferring the executable code block from semipermanent memory to RAM includes performing an initial transfer of the executable code block from semipermanent memory to RAM, with any data of the initial code block that would overwrite the bootloader being stored in a temporary location in RAM and then copying the data stored in temporary locations to the correct locations in RAM for execution.

12. The method of claim 11, wherein the step of sensing the configuration in which the scanner is to be used includes sensing jumper settings on a control board of the scanner.

* * * * *